(12) United States Patent
Govindappa et al.

(10) Patent No.: US 10,752,269 B2
(45) Date of Patent: Aug. 25, 2020

(54) SYSTEM FOR VEHICLE SUBSYSTEM CONTROL

(71) Applicant: General Electric Company, Schenectady, NY (US)

(72) Inventors: Suresh Govindappa, Lawrence Park, PA (US); Manibabu Pippalla, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 327 days.

(21) Appl. No.: 15/831,549

(22) Filed: Dec. 5, 2017

(65) Prior Publication Data

US 2018/0257683 A1   Sep. 13, 2018

Related U.S. Application Data

(60) Provisional application No. 62/469,368, filed on Mar. 9, 2017.

(51) Int. Cl.
| | |
|---|---|
| *B61L 15/00* | (2006.01) |
| *G07C 5/08* | (2006.01) |
| *B61L 27/00* | (2006.01) |
| *B61L 23/00* | (2006.01) |

(Continued)

(52) U.S. Cl.
CPC ....... *B61L 15/0081* (2013.01); *B61L 27/0077* (2013.01); *B61L 27/0094* (2013.01); *G07C 5/0816* (2013.01); *B60W 50/00* (2013.01); *B61L 15/0072* (2013.01); *B61L 23/00* (2013.01); *G07C 5/008* (2013.01); *G07C 5/0808* (2013.01)

(58) Field of Classification Search
CPC ............ B61L 15/0081; B61L 27/0094; B61L 27/0077; B61L 15/0072; B61L 23/00; G07C 5/0816; G07C 5/008; G07C 5/0808; B60W 50/00
See application file for complete search history.

(56) References Cited

U.S. PATENT DOCUMENTS

| | | | |
|---|---|---|---|
| 2003/0097218 A1* | 5/2003 | Borugian | ................ B60R 25/04 701/468 |
| 2003/0208309 A1* | 11/2003 | Triphathi | ............... G07C 5/008 701/33.4 |

(Continued)

*Primary Examiner* — Adam R Mott
(74) *Attorney, Agent, or Firm* — Buckley, Maschoff & Talwalkar LLC (57) ABSTRACT

A system includes one or more processors configured to obtain operating parameters of a subsystem of a vehicle that is configured to travel along a route during a trip. The one or more processors are configured to generate a digital twin of the subsystem based on the operating parameters, and to receive simulated performance data generated by execution of the digital twin with a designated model of the subsystem. The one or more processors are further configured to obtain field performance data of the subsystem monitored by sensors onboard the vehicle during the trip, and to determine a performance composite index of the subsystem of the vehicle based on a variance between the simulated performance data and the field performance data. The one or more processors are also configured to control the vehicle during the trip or a subsequent trip based on the performance composite index.

20 Claims, 5 Drawing Sheets

(51) Int. Cl.
*G07C 5/00* (2006.01)
*B60W 50/00* (2006.01)

(56) References Cited

U.S. PATENT DOCUMENTS

| | | | |
|---|---|---|---|
| 2011/0160982 A1* | 6/2011 | Kumar | F02D 41/0025 |
| | | | 701/103 |
| 2017/0151965 A1 | 6/2017 | Brooks et al. | |
| 2017/0284974 A1 | 10/2017 | Hershey et al. | |
| 2017/0286572 A1 | 10/2017 | Hershey et al. | |
| 2018/0073418 A1* | 3/2018 | Bonkoski | F01P 7/16 |

* cited by examiner

SYSTEM FOR VEHICLE SUBSYSTEM CONTROL

CROSS-REFERENCE TO RELATED APPLICATIONS

This application claims priority to U.S. Provisional Application No. 62/469,368, which was filed on 9 Mar. 2017, and the entire disclosure of which is incorporated herein by reference.

BACKGROUND

Vehicles may include various subsystems that provide designated functions for the vehicle, such as a propulsion subsystem to generate tractive effort for moving the vehicle and a cooling system to maintain temperatures of components of the vehicle at safe levels to prevent damage to the components and maintain operability of the components. Other subsystems may include an electrical subsystem that provides current to power lights, batteries, displays, communication devices, and computing devices of the vehicle, and a heating, ventilation, and air-conditioning (HVAC) subsystem that maintains temperatures of designated spaces of the vehicle, such as passenger compartments or refrigerated cargo compartments.

Over time, the various subsystems may become damaged and/or fail. Unexpected damage and/or failure of some subsystems may cause the vehicle to be non-operational for a downtime period until the subsystem is repaired. Such downtime periods can result in significant delays and financial losses. Furthermore, the failures of some subsystems, such as a propulsion subsystem or a cooling subsystem, can leave a vehicle debilitated on a route. The debilitated vehicle can block movement of other vehicles along the route, increasing the extent of the delays and financial losses attributable to the failed subsystem.

One way to reduce the occurrence of damage and/or failure to the subsystems of a vehicle is to increase the frequency at which the subsystems are inspected, repaired, and/or replaced, but such actions can be time consuming and expensive. The time spent to inspect the vehicles reduces the time that the vehicles are in operation, therefore reducing the productivity and financial gain of the vehicles. Furthermore, even routine inspections may not reduce damage and/or failure of the subsystems. For example, the root cause of damage to a subsystem may occur after one inspection and cause the subsystem to fail before a subsequent inspection. Additionally, it may be difficult to identify and diagnose a root cause of damage to a subsystem during an inspection.

BRIEF DESCRIPTION

In an embodiment, a system is provided that includes one or more processors configured to obtain operating parameters of a subsystem of a vehicle that is configured to travel along a route during a trip. The one or more processors are configured to generate a digital twin of the subsystem based on the operating parameters. The one or more processors are configured to receive simulated performance data generated by execution of the digital twin with a designated model of the subsystem. The one or more processors are further configured to obtain field performance data of the subsystem that is monitored by one or more sensors onboard the vehicle during the trip, and to determine a performance composite index of the subsystem of the vehicle based on a variance between the simulated performance data and the field performance data. The one or more processors are also configured to control the vehicle during the trip or during a subsequent trip of the vehicle based on the performance composite index.

In another embodiment, a system is provided that includes one or more processors configured to obtain operating parameters of a subsystem of a vehicle that is configured to travel along a route during a trip. The one or more processors are configured to generate a digital twin of the subsystem based on the operating parameters. The one or more processors are configured to receive simulated performance data generated by execution of the digital twin with a designated model of the subsystem. The one or more processors are further configured to obtain field performance data of the subsystem that is monitored by one or more sensors onboard the vehicle during the trip, and to determine a performance composite index of the subsystem of the vehicle based on a variance between the simulated performance data and the field performance data.

In another embodiment, a method is provided that includes obtaining operating parameters of a subsystem of a vehicle that is configured to travel along a route during a trip. The method also includes generating a digital twin of the subsystem based on the operating parameters, and receiving simulated performance data generated by execution of the digital twin with a designated model of the subsystem. The method further includes obtaining field performance data of the subsystem that is monitored by one or more sensors onboard the vehicle during the trip, and determining a performance composite index of the subsystem of the vehicle based on a variance between the simulated performance data and the field performance data.

In another embodiment, a system is provided that includes one or more processors. The one or more processors are configured to obtain operating parameters of a subsystem of a vehicle during a trip of the vehicle along a route and environmental conditions experienced by the subsystem during the trip. The one or more processors are configured to evaluate the operating parameters and the environmental conditions in a numerical model of the subsystem to generate simulated performance data of the subsystem. The simulated performance data represents expected performance of the subsystem during the trip based on the operating parameters and the environmental conditions experienced by the subsystem. The numerical model of the subsystem is built using characteristic information about the subsystem, one or more physics-based models associated with how the subsystem operates, and historical performance data acquired over time by monitoring one or more of the subsystem or similar subsystems. The one or more processors are further configured to obtain field performance data of the subsystem that is monitored by one or more sensors onboard the vehicle during the trip and to determine a performance composite index of the subsystem of the vehicle based on a variance between the simulated performance data and the field performance data. The one or more processors are further configured to control the vehicle during the trip or during a subsequent trip of the vehicle based on the performance composite index.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide systems and methods that control a vehicle based on a performance, condition, or health state of a subsystem of the vehicle. The systems and methods described herein are not limited to any one subsystem, but rather can be utilized with various subsystems. For example, the subsystem may be a cooling subsystem, a propulsion subsystem, an HVAC subsystem, an electrical subsystem, or the like. The embodiments described herein determine a performance composite index (also referred to herein as performance index) for a designated subsystem of a vehicle. The performance index represents the health state or condition of the subsystem, and is based on performance of the subsystem. To determine a performance index of the subsystem, the systems and methods are configured to generate a digital twin of the subsystem for a trip of the vehicle, and then execute the digital twin with a physics-based simulation model of the subsystem.

For example, one or more embodiments are directed to utilizing current (e.g., real-time) vehicle data and/or historical vehicle data of a vehicle on a trip to evaluate the actual performance of the vehicle on the trip relative to simulated performance of the vehicle on the trip derived using a dynamic physics-based model. The actual monitored performance data is compared to simulated performance data generated via the physics-based model to predict the health or condition of a subsystem of the vehicle. In an embodiment, multiple physics-based models associated with different subsystems may be integrated within a modeling tool that is configured to predict vehicle capability for a given set of conditions or circumstances.

The digital twin is a numerical representation of the subsystem of the vehicle. In order to generate the digital twin for a subsystem, the systems and methods obtain operating parameters of the subsystem. At least some of the operating parameters may be received from sensors operably connected with the vehicle. The operating parameters may be indicative of a state of the subsystem of the vehicle. For example, the operating parameters may identify the subsystem and/or components thereof, may indicate usage or settings of the subsystem, may provide values of monitored parameters (e.g., vehicle temperatures or ambient temperatures), or the like. The systems and methods generate a digital twin for the subsystem using the operating parameters that are obtained and other information about the trip, such as environmental conditions experienced by the vehicle during the trip. The digital twin is executed in a physics-based model that is associated with the corresponding subsystem to produce the simulated performance data of the subsystem during the trip.

The systems and methods determine a performance composite index of the subsystem of the vehicle based on a calculated variance between the simulated performance data of the subsystem and actual performance data of the subsystem during the trip. The actual performance data is obtained from sensors onboard the vehicle and/or sensors disposed off-board but near the vehicle, such as sensors along the route. A low level of variance between the simulated performance data and the actual monitored performance data indicates a relatively high performance index (e.g., good or at least satisfactory health or condition) for the subsystem. For example, the simulated performance data may represent an output that is expected for a healthy subsystem that is functioning as designed. The subsystem of the vehicle has good or at least satisfactory health if the actual output is close to (e.g., within a designated variance threshold of) the simulated performance data. A high performance index may indicate that the subsystem is capable of performing an impending task with a very low likelihood that the subsystem will fail under a particular set of circumstances (e.g., environmental factors, load factors, distance of a trip, or the like). The high performance index may also indicate that the subsystem is working properly and does not need preventative maintenance.

Alternatively, a greater level of variance (e.g., that exceeds the designated variance threshold) between the simulated performance data and the actual monitored performance data indicates a relatively low performance index (e.g., poor or below satisfactory health) for the subsystem. The low performance index indicates that the subsystem is not performing as the subsystem is expected to perform based on the simulated performance data. The low performance index may indicate that the subsystem is unable to perform an impending task without maintenance. For example, a low performance index may indicate the subsystem could fail during an impeding task under a particular set of circumstances.

The performance index may be a quantitative and/or qualitative amount or value (e.g., a score). In an embodiment, the performance index is based on an amount of variation between the simulated performance data and the actual monitored performance data, and allows for ranking the subsystems and determining different degrees of good and poor health. For example, a first cooling system with a less than satisfactory performance index may be ranked as having better health than a second cooling system that also has a less than satisfactory performance index if the variance associated with the first cooling system is greater than the variance associated with the second cooling system. As a result, a vehicle having the first cooling system may be selected over a vehicle having the second cooling system for an impending task because the first cooling system has lower likelihood of failure during the impending task than the second cooling system.

The systems and methods may take various actions in response to determining the performance index of the subsystem of the vehicle. For example, the systems and methods may change or control actual operation of the subsystem during a trip based on the performance index. Thus, if the subsystem is determined to have a relatively poor performance index, the system and methods may apply a brake to stop or at least slow the movement of the vehicle, may prevent the vehicle from moving from a stationary position, or may limit the acceleration, speed, and/or distance traveled by the vehicle to reduce strain on the subsystem and/or prevent additional damage to the subsystem. Furthermore, the systems and method may change a task (e.g., switch or cancel a planned trip) of the vehicle to reduce the risk of failure during performance of the planned task. Furthermore, the systems and methods may activate an output device to notify an operator of the health score of the subsystem. The systems and methods may optionally automatically schedule preventative maintenance for the vehicle based on the health score. The systems and methods may predict a remaining life of the subsystem based in part on the performance index. The remaining life of the subsystem refers to an amount of time before the subsystem requires significant component replacement.

At least one technical effect of the subject matter described herein is the systems and methods can reduce the occurrence of subsystem damage and failure, which reduces downtime of the vehicle and also reduces the amount of money spent on repairs and replacement parts (e.g., relative to not determining a performance index as described herein). The reduced occurrence of subsystem failure can also improve vehicle network throughput by reducing the amount of debilitated vehicles that block the movement of other vehicles in the network. At least one technical effect identifies and isolates poor performing subsystems during without interfering with the operation of the vehicle. For example, scheduled maintenance is not required to determine the health (or performance condition) of the subsystems of a vehicle. At least one technical effect is the ability to predict a failure of the subsystem and to schedule preventative maintenance prior to such failure to avoid downtimes and blocked routes. Another technical effect is the ability to rank and schedule available vehicles in a fleet for various tasks (e.g., trips or missions) based on the determined performance index of the subsystems of the vehicles. Another technical effect is the ability to combine the performance index with degradation data to predict the remaining life of the subsystem (or components thereof). The execution of the digital twin on the physics-based simulation model can also be used to predict the performance of a subsystem of a vehicle across an entire operating range of the vehicle. The information gleaned can be used to improve vehicle design and vehicle control to increase efficiency, profits, and working lifetimes of the subsystems and components thereof.

Figure 1:
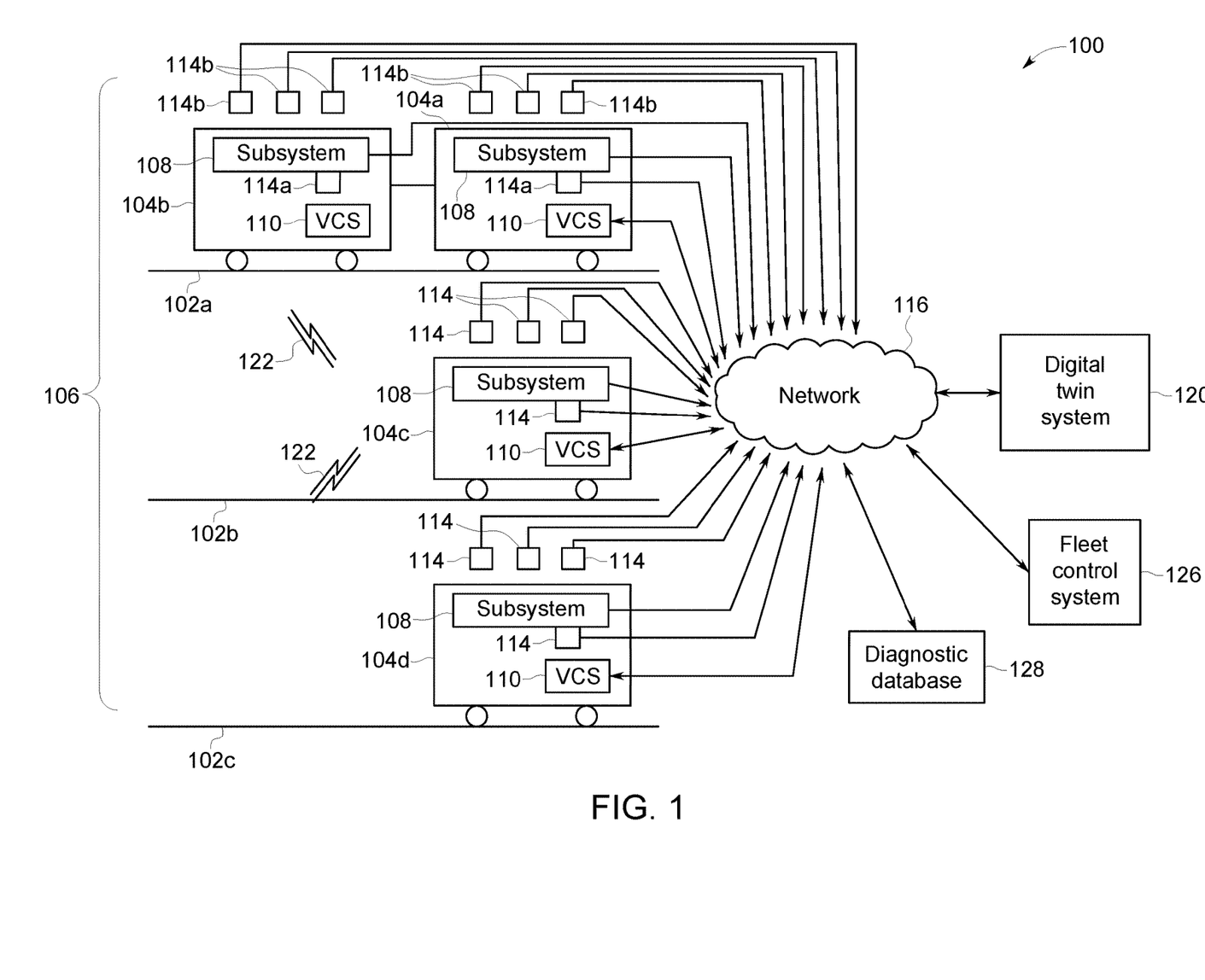
FIG. 1 illustrates one embodiment of a communication system that includes a vehicle fleet, a network, a digital twin system, a fleet control system, and a diagnostics database.

FIG. 1 illustrates one embodiment of a communication system 100 that includes a vehicle fleet 106, a network 116, a digital twin system 120, a fleet control system 126, and a diagnostics database 128. The illustrated vehicle fleet 106 includes propulsion-generating vehicles 104, which are referred to herein as vehicles 104. Although not shown, the fleet 106 may also include one or more non-propulsion-generating vehicles mechanically coupled to the vehicles 104. Optionally, one or more of the vehicles 104 of the fleet 106 may be mechanically coupled with each other to travel together along a route 102. In the illustrated embodiment, the fleet 106 includes four vehicles 104a-d. The vehicles 104a and 104b are mechanically coupled with each other and travel together along route 102a. The vehicle 104c travels along a route 102b, and the vehicle 104d travels along route 102c. The number and arrangement of the vehicles 104 of the fleet 106 in FIG. 1 are provided as one example and are not intended as limitations on all embodiments of the subject matter described herein. For example, the fleet 106 may have other numbers and arrangements of propulsion-generating vehicles in other embodiments. In one embodiment, the vehicles 104a-d are locomotives that travel along rails. Alternatively, the vehicles 104a-d may represent other vehicles, such as automobiles, rail vehicles, trucks, marine vessels, aerial drones, other aerial vehicles, or the like.

The vehicles 104 each include a vehicle control system (VCS) 110 disposed onboard the vehicles 104. The vehicle control system 110 can include hardware circuits or circuitry that include and/or are connected with one or more processors. The vehicle control system 110 is configured to control movement of the vehicles 104 based on received command signals. For example, the vehicle control system 110 can control tractive effort and braking effort of the respective vehicle 104. The vehicle control system 110 receives the command signals from an onboard operator using an onboard input device (e.g., a touchscreen, keyboard, trackpad, microphone, or the like), a remote operator using an off-board input device, an energy management system that provides a trip plan, or the like. The vehicle control systems 110 of the different vehicles 104a-d can communicate with each other through establishment of a communication link 122. For example, the vehicles 104a, 104b may communicate with the vehicle 104c across the communication link 122 in order to coordinate movements of the vehicles 104a-c.

The vehicles 104 each include multiple subsystems disposed onboard the vehicles 104, although only one subsystem 108 per vehicle 104 is illustrated in FIG. 1. Each subsystem has one or more specific functions for the vehicle 104, such as to provide tractive effort, to maintain a temperature of propulsion components within a designated temperature range, to maintain a temperature of a passenger or cargo compartment within a designated temperature range, to provide electric current to power various electrical devices of the vehicle 104, and the like. The subsystem 108 may include multiple components specific to the subsystem 108. Damage to one or more of the components may cause the subsystem 108 to fail, which can require immediate maintenance and optionally may debilitate the vehicle 104. Some of the various subsystems of the vehicles 104 that may represent the illustrated subsystem 108 are described in more detail with reference to FIG. 2.

The vehicles 104 include one or more sensors 114 operably connected with the vehicle control system 110. The sensors 114 are configured to monitor operating parameters of the vehicle 104. The sensors 114 may be disposed onboard the corresponding vehicle 104 and/or off-board the vehicle 104 but near the vehicle 104 in order to monitor an operating parameter of the vehicle 104. For example, in the illustrated embodiment, the vehicle 104a includes a sensor 114a disposed onboard the vehicle 104a, and three sensors 114b disposed off-board the vehicle 104a, such as positioned along the route 102a. The operating parameters monitored by the sensors 114 may indicate a status of the vehicle 104, such as whether the vehicle 104 is moving or stationary, a speed of the vehicle 104, a relative or absolute location of the vehicle 104, a temperature of a specific component (e.g., engine, lubricant oil, manifold air, coolant), a throttle setting, a fuel input rate, a fuel supply, an electric current supply in a battery, or the like. At least some of the sensors 114 may also monitor environmental conditions experienced by the vehicle 104, such as ambient temperature, humidity, barometric pressure, altitude, wind, precipitation, and the like. The sensors 114 are configured to provide data representing the values of the monitored operating parameters and environmental conditions to the vehicle control system 110 of the respective vehicle 104. For example, the sensors 114 may transmit the data to the vehicle control system 110 in status signals that are transmitted through a wired or wireless connection. The status signals may be sent periodically, upon request, or when the vehicle is in range of the sensor 114.

The communication system 100 also includes the diagnostic database 128 which is disposed off-board the vehicles 104 in the fleet 106. The diagnostic database 128 may represent or be contained within a digital memory device, such as a computer hard disc, a read only memory (ROM), a random access memory (RAM), an optical disc, a removable drive, etc. The diagnostic database 128 is configured to obtain and store information about the fleet 106. For example, the diagnostic database 128 may store information about the identities of the vehicles 104a-d in the fleet 106, information about the routes 102a-c traveled by the vehicles 104, information about trips taken by the vehicles 104 along the routes 102, and the like, over a period of time. For example, the diagnostic database 128 may receive and log at least some of the operating parameters and environmental conditions that are monitored by the sensors 114. The operating parameters represent actual monitored performance data of the subsystems, and may include a coolant temperature, an oil temperature, a manifold air temperature, a tractive output (e.g., horsepower), an emissions output, a fuel consumption rate, and the like. Such information, including the performance data and the environmental conditions, is logged and associated with the identity of the vehicle 104 and the date that the information was recorded. As described herein, the information stored in the diagnostic database 128 may be used by the digital twin system 120 to generate a digital twin for a subsystem of a vehicle. Additionally or alternatively, the information stored in the diagnostic database 128 may be used to determine a performance index of a subsystem of a vehicle by comparing the actual performance data of a subsystem of a vehicle to simulated performance data of the digital twin of the subsystem.

The digital twin system 120 is disposed off-board the vehicles 104 of the fleet 106. The digital twin system 120 includes or represents one or more processors (e.g., microprocessors, field programmable gate arrays, application specific integrated circuits, multi-core processors, or other electronic circuitry) that implement instructions of a computer program by carrying out arithmetic, logical, control, and/or input/output operations specified by the instructions. The digital twin system 120 is configured to receive operating parameters of a subsystem 108 of one of the vehicles 104, and generates a digital twin of the subsystem 108 based on the operating parameters. The digital twin system 120 may receive the operating parameters from the vehicle control system 110 of the vehicle 104, from the diagnostic database 128, and/or from an operator input using an input device of the digital twin system 120 (as described in more detail with reference to FIG. 3). The digital twin system 120 may also determine a performance index of the subsystem 108 of the vehicle 104 based on simulated performance of the subsystem 108 obtained from a designated model of the subsystem 108. Optionally, the digital twin system 120 may take a responsive action after determining the performance index of the subsystem 108, such as by scheduling preventative maintenance for the vehicle 104, limiting the movement of the vehicle 104, notifying an operator using an output device, selecting a subsequent trip for the vehicle 104, estimating a remaining life of the subsystem, or the like.

The fleet control system 126 is disposed off-board the vehicles 104 of the fleet 106. The fleet control system 126 includes or represents one or more processors (e.g., microprocessors, field programmable gate arrays, application specific integrated circuits, multi-core processors, or other electronic circuitry) that implement instructions of a computer program by carrying out arithmetic, logical, control, and/or input/output operations specified by the instructions. The fleet control system 126 is configured to coordinate the movement of the vehicles 104a-d of the fleet 106 along the routes 102a-c. For example, the fleet control system 126 may select which tasks or trips are assigned to each of the vehicles 104. The fleet control system 126 may also determine trip schedules that are communicated to the vehicles 104. The fleet control system 126 may be located at a dispatch location.

The communication system 100 includes a network 116. The network 116 is a website, a server, a computer, a cloud-service, or a computing device connected to the Internet. The network 116 can be coupled to one or more devices via wired or wireless connectivity in which data communications are enabled between the network 116 and at least one of a second network, a subnetwork of the network 116, of a combination thereof. Multiple networks can be used with the communication system 100 and data communication on networks can be selected based on application-specific criteria. The network 116 can transmit/receive data communicated by one or more of the vehicles 104 in the fleet 106, the digital twin system 120, the diagnostic database 128, the fleet control system 126, or a combination of two or more thereof. For example, the network 116 may receive monitored operating parameters communicated by one or more of the vehicle control systems 110, and transmits the operating parameters to the diagnostic database 128. Additionally or alternatively, the network 116 may receive a digital message including the performance index of various subsystems 108 of the vehicles 104 in the fleet 106, and transmits the message to the fleet control system 126 for the fleet control system 126 to rank and/or select the vehicles 104 for upcoming trips or tasks based on the performance index.

Although illustrated as separate and discrete components or devices, at least two of the digital twin system 120, the fleet control system 126, and the diagnostic database 128 may be combined within a common device in an alternative embodiment. In another alternative embodiment, the digital twin system 120, the fleet control system 126, and/or the diagnostic database 128 may be disposed onboard one of the vehicles 104 instead of located remote from the vehicles 104.

Figure 2:
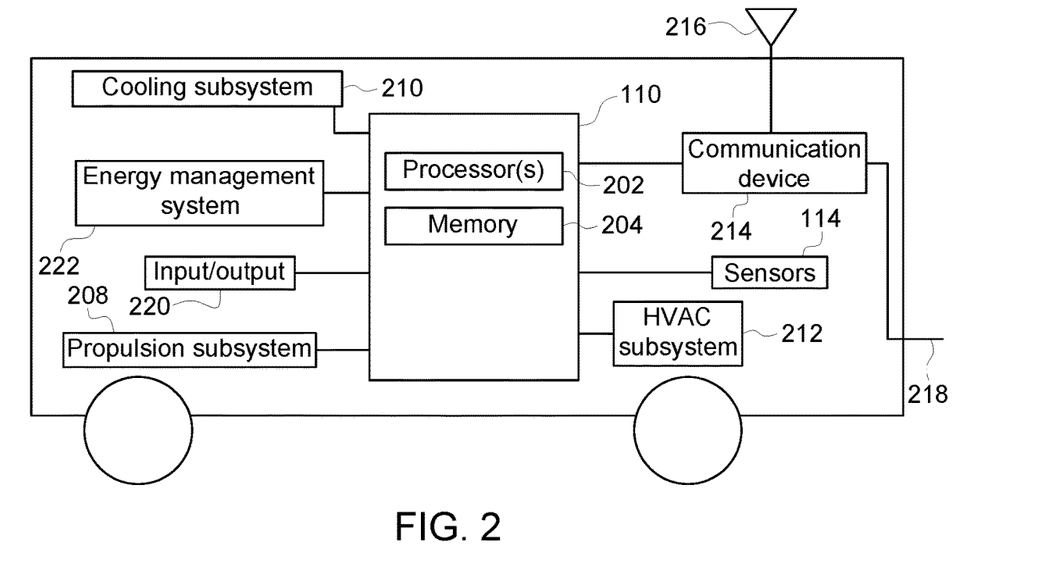
FIG. 2 is a schematic illustration of one of the vehicles of the vehicle fleet according to an embodiment.

FIG. 2 is a schematic illustration of one of the vehicles 104 of the fleet 106 (shown in FIG. 1) according to an embodiment. The vehicle control system 110 controls operation of the vehicle 104, and may include one or more processor(s) 202 or other logic-based device(s) that perform operations based on instructions stored on a tangible and non-transitory computer readable storage medium or memory 204. The memory 204 may be a computer hard disc, read only memory, random access memory, optical disc, removable drive, etc. The vehicle control system 110 may additionally or alternatively include one or more hard-wired devices that perform operations based on hard-wired logic of the devices. The vehicle control system 110 may represent the hardware that operates based on software or hardwired instructions, the software that directs hardware to perform the operations, or a combination thereof.

The vehicle control system 110 is operatively connected with multiple subsystems of the vehicle 104. For example, the vehicle 104 includes a propulsion subsystem 208 that provides tractive effort and/or braking effort for the propulsion-generating vehicle 104. The propulsion subsystem 208 may include or represent one or more engines, motors, inverters, transformers, alternators, generators, brakes, batteries, turbines, fuel pumps, and the like, that operate to propel the vehicle 104 and slow the vehicle 104. The vehicle control system 110 may generate control signals autonomously or based on manual input for controlling operation of the propulsion subsystem 208. The control signals are transmitted to components of the propulsion subsystem 208 to direct operations of the propulsion subsystem 208. For example, the control signals may include tractive (e.g., notch) settings, braking settings, speed settings, or the like. Additionally or alternatively, the propulsion subsystem 208 can include electric components that power motors to propel the vehicle 104 using electric energy obtained from an onboard storage device (e.g., batteries) and/or from an off-board source (e.g., a catenary and/or electrified rail), such as transformers, converters, inverters, and the like.

The vehicle 104 also includes a cooling subsystem 210 that cools components of the propulsion subsystem 208. For example, the cooling subsystem 210 pumps fluid coolant (e.g., liquid coolant or air) through and/or around the one or more engines, inverters, transformers, motors, alternators, generators, brakes, batteries, or the like, in order to maintain the temperatures of these components sufficiently low to prevent damage to these or other components. The cooling subsystem 210 may include one or more blowers (e.g., fans) that move air and/or pumps that move coolant fluids (e.g., water or other liquid coolant). The vehicle control system 110 may monitor and/or control operation of the cooling subsystem 210. For example, the vehicle control system 110 may increase, decrease, or stop the flow of coolant through the cooling subsystem 210 to affect the amount of heat absorbed by the coolant.

The vehicle 104 also includes an HVAC subsystem 212 that is configured to control a temperature within an operator compartment, a passenger compartment, and/or a cargo compartment of the vehicle 104. The HVAC subsystem 212 may include a radiator, an air-conditioner, a furnace, blowers, pumps, conduits, and the like. The HVAC subsystem 212 may be controlled by the vehicle control system 110 and/or a thermostat accessed by an operator and/or a passenger.

The propulsion subsystem 208, the cooling subsystem 210, and the HVAC subsystem 212 shown in FIG. 2 are merely example subsystems within each vehicle 104 of the fleet 106. The vehicles 104 of the fleet 106 may include additional and/or different subsystems in other embodiments, such as an electrical subsystem, a regenerative braking subsystem, a wheel/axle suspension subsystem, and the like.

The vehicle control system 110 is connected with a communication device 214 in the vehicle 104. The communication device 214 can communicate with an off-board location, such as another vehicle 104 in the fleet 106, the fleet control system 126 at a dispatch facility, the digital twin system 120, the diagnostic database 128, or the like. The communication device 214 communicates via wired and/or wireless connections (e.g., via radio frequency). The communication device 214 can include a wireless antenna 216 and associated circuitry and software to communicate wirelessly. For example, the communication device 214 may include a transceiver, or a discrete receiver and transmitter. Additionally or alternatively, the communication device 214 may be connected via a cable 218 to another vehicle 104. For example, the cable 218 may extend between the vehicle 104a and the vehicle 104b in FIG. 1. The cable 218 may be a trainline, a multiple unit cable, an electronically-controlled pneumatic brake line, or the like. The communication device 214 can be used to transmit a variety of information described herein, such as transmitting operating parameters of a subsystem of the vehicle 104 remotely to one or more of the digital twin system 120, the diagnostic database 128, or the fleet control system 126. For example, the operating parameters may be obtained or generated by sensors 114 onboard the vehicle 104 to reflect actual performance data during a trip, and the communication device 214 communicates the operating parameters remotely for analysis of the vehicle subsystem performance.

The communication device 214 is also configured to receive signals, such as command messages, which are forwarded to the vehicle control system 110 for analysis. For example, the vehicle control system 110 of the vehicle 104 can examine received command messages to determine a directive and the source of the directive. The vehicle control system 110 may autonomously implement the directive by creating control signals that are communicated to the propulsion subsystem 208 or other subsystems. The vehicle control system 110 may also present the directive to an operator on an input/output device 220 to notify the operator of the directive and/or suggest manual implementation of the directive. The input/output device 220 includes and/or represents one or more keyboards, throttles, switches, buttons, pedals, microphones, speakers, displays, touchscreens, and the like. The input/output device 220 may be used by an operator to provide an operator input and/or monitor performance and/or a status of the vehicle 104.

The vehicle control system 110 is optionally connected with an energy management system 222. The energy management system 222 can include hardware circuits or circuitry that include and/or are connected with one or more processors. The energy management system 222 may generate and/or retrieve a trip plan for a trip of the vehicle 104. The trip plan may designate operational settings of the propulsion-generating vehicle 104 as a function of one or more of time, location, or distance along a route for a trip. Movement of the vehicle 104 according to the operational settings designated by the trip plan may reduce fuel consumed, total trip time, and/or emissions generated by the vehicle 104 relative to the vehicle 104 traveling according to manual control. The energy management system 222 is optional.

Figure 3:
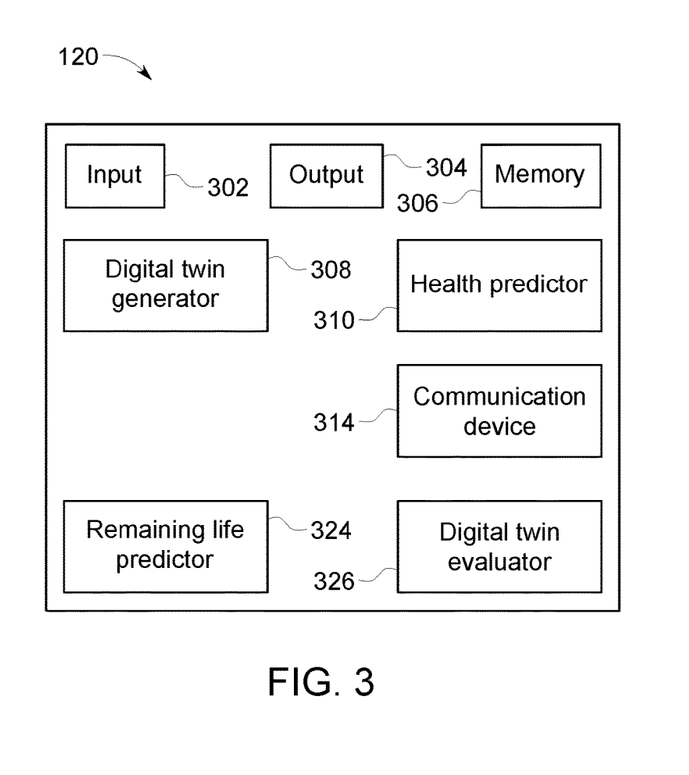
FIG. 3 illustrates a schematic illustration of the digital twin system in accordance with one embodiment.

FIG. 3 illustrates a schematic illustration of the digital twin system 120 in accordance with one embodiment. The digital twin system 120 includes an input device 302 and an output device 304 that allows an operator at the digital twin system 120 to interact with the digital twin system 120. For example, the input device 302 may be a touchscreen, keyboard, electronic mouse, microphone, or the like, that receives a manual input from the operator. For example, the operator may use the input device 302 to select a vehicle 104, a subsystem of the vehicle 104, a trip of the vehicle 104, and/or a date and/or time of the trip, in order to generate a digital twin of the subsystem during the trip. The operator may also use the input device 302 to input various operating parameters of the subsystem into the digital twin system 120. The digital twin system 120 can present information to the operator using the output device 304, which can represent a display screen (e.g., a touchscreen or other screen), an audio speaker, printer, or the like. For example, the digital twin system 120 can present the information about the subsystem of the vehicle 104 that is selected for generating a digital twin, information about the digital twin, actual monitored performance data of the subsystem during the trip (as monitored by the sensors 114), and/or simulated performance data of the subsystem during the trip (as generated by a designated model of the subsystem). The output device 304 can also provide a performance index of the subsystem to the operator and suggest an additional action, such as scheduling preventative maintenance for the vehicle. Optionally, instead of two discrete devices, the input device 302 and the output device 304 may be integrated into a single device, such as a work station or computer having a touchscreen and a display.

The digital twin system 120 also includes a communication device 314, which allows the digital twin system 120 to communicate with the vehicles 104, the diagnostic database 128, and/or the fleet control system 126. The communication device 314 may communicate with the vehicles 104, database 128, and/or fleet control system 126 either directly, via direct wireless transmission, or indirectly over the network 116. In an embodiment, the communication device 314 is similar in structure and functionality as the communication device 214 of the vehicle 104, and therefore is not described in detail herein.

Figure 4:
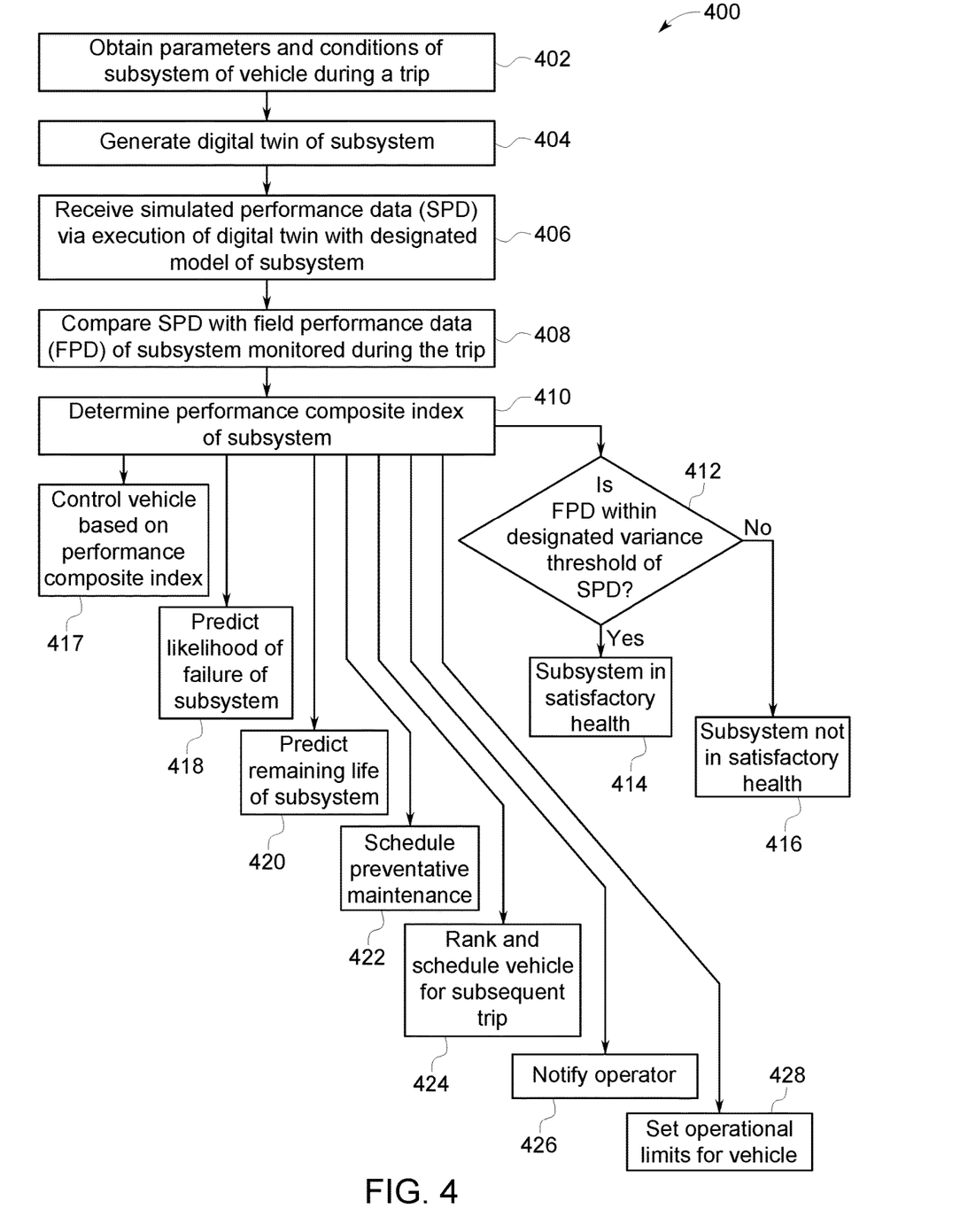
FIG. 4 is a flow chart of a method for determining a health of a vehicle subsystem according to an embodiment.

Although not explicitly identified in FIG. 3, the digital twin system 120 includes one or more processors. For example, the digital twin generator 308, the digital twin evaluator 326, and the health predictor 310 may each include or represent at least one processor that performs various functions described herein. For example, the one or more processors of the digital twin system 120 may perform at least some of the steps of the method 400 for determining a health or performance condition of a vehicle subsystem that is shown in FIG. 4. The digital twin system 120 further includes a digital memory 306, which may represent a computer hard drive, random access memory, read-only memory, dynamic random access memory, an optical drive, or the like. The memory 306 may store the program instructions that are carried out by the one or more processors of the digital twin system 120. Additionally, the memory 306 may store actual performance data (including operating parameters) and/or simulated performance data of the subsystems of the vehicles 104. For example, in one embodiment, the digital twin system 120 may be configured to request actual performance data and environmental conditions regarding a past trip of a vehicle from the diagnostic database 128, and the digital twin system 120 stores (at least temporarily) the information that is received in the memory 306.

Additional reference is made to FIG. 4, which is a flow chart of a method 400 for controlling a vehicle based on a determined health or performance condition of a vehicle subsystem according to an embodiment. At least some of the steps of the method 400 are performed by one or more processors of the digital twin system 120. At 402, operating parameters and environmental conditions of a subsystem of a vehicle during a trip are obtained. The digital twin system 120 first receives an operator input selection of a specific subsystem of a specific vehicle 104 of the fleet 106. For example, the operator may select the cooling subsystem 210 of the vehicle 104b in order to determine the health of the cooling subsystem 210. The operator may also select a specific trip or date in order to identify additional information that is used to generate the digital twin of the subsystem 210.

Figure 5:
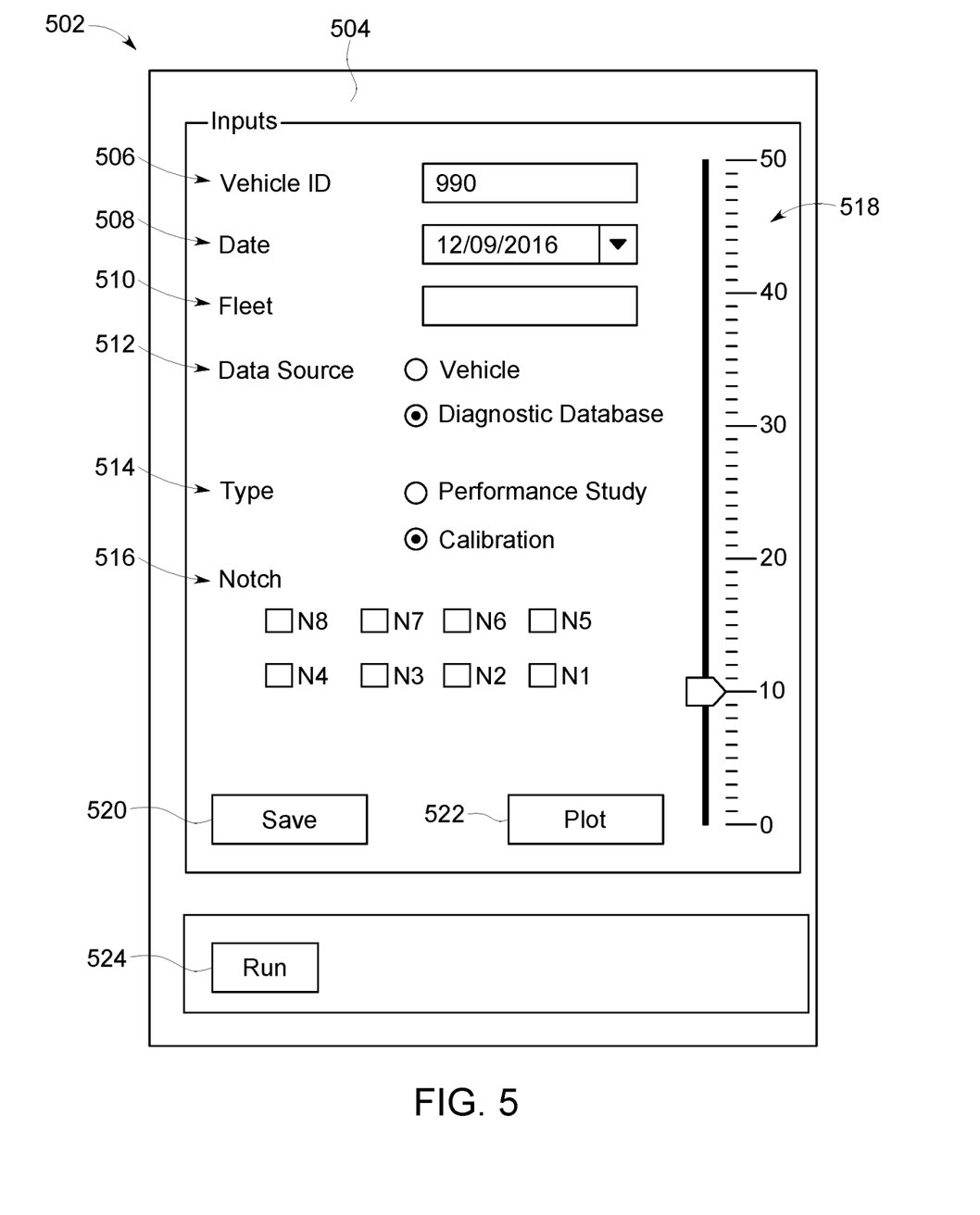
FIG. 5 illustrates a graphical user interface for the digital twin system for providing input information according to an embodiment.

For example, FIG. 5 shows a graphical user interface 502 for the digital twin system 120 according to an embodiment. The graphical user interface 502 may be generated by the input device 302 and the output device 304. The graphical user interface 502 displays an input window 504 that prompts an operator to select various input information that is used to generate the digital twin. For example, the window 504 includes a Vehicle ID selection 506, a Date selection 508, a Fleet selection 510, a Data Source selection 512, a Type selection 514, a Notch selection 516, and a Data Point selection 518. The operator can select the vehicle by inputting a vehicle ID for the desired vehicle, which in the illustrated embodiment is "990," and can select the date and the fleet by filling out the corresponding selections 508, 510. The Data Source selection 512 is a choice between the Vehicle or the Diagnostic Database, and refers to the source of the parameters and environmental conditions. For example, the Vehicle may be selected to receive transient, current information from the vehicle that changes over time, while the Diagnostic Database may be selected to receive static information from a past trip. The Type selection 514 is a choice between a Performance Study and a Calibration. The Notch selection 516 is a choice of tractive engine settings, and ranges in integers from N1 through N8. The Data Point selection 518 refers to the number of data points to evaluate, and ranges from 0 to 50. In general, a greater amount of data points may produce a more accurate digital twin simulation, as the expense of a greater amount of calculation time relative to a lesser amount of data points. Although not shown, the window 504 may also include an ability to select the specific subsystem of the vehicle. The window 504 also includes various buttons, including a Save button 520, a Plot button 522, and a Run button 524. The Run button 524 is selected to initiate a simulation, as described in more detail below.

Once the trip and/or date is known, the digital twin system 120 can obtain operating parameters of the subsystem 210 during the selected trip and environmental conditions experienced by the vehicle 104b during the selected trip. The operating parameters and environmental conditions during the trip are monitored by the sensors 114. If the selected trip is a current trip that is happening during the execution of the method 400, the operating parameters and environmental conditions may be received from the vehicle control system 110 of the vehicle 104b. If, on the other hand, the selected trip happened in the past, the operating parameters and environmental conditions are obtained from the diagnostic database 128 which logs such information for the various vehicles 104 of the fleet 106. The operating parameters may include one or more of throttle settings, brake settings, speed settings, radiator fan speeds, pump speeds, coolant flow rates, cargo loads, route characteristics (e.g., terrain, slope, distance of trip, etc.), operating constraints (e.g., speed, noise, and/or emissions restrictions), and the like. The environmental conditions may include one or more of ambient temperature, barometric pressure, altitude, humidity, wind, precipitation, and the like, encountered by the vehicle 104b during the trip.

At 404, a digital twin of the selected subsystem of the selected vehicle is generated for the trip. As shown in FIG. 3, the digital twin system 120 includes a digital twin generator 308 that is configured to generate the digital twin. The digital twin generator 308 is composed of one or more processors of the digital twin system 120. The digital twin is a numerical representation of the physical components of the subsystem of the vehicle on the specified date and trip. For example, the digital twin may be a numerical representation of the cooling subsystem 210 of the vehicle 104b. The digital twin generator 308 can create the digital twin using the operating parameters and environmental conditions that are obtained, as well as other known information about the subsystem of the vehicle (e.g., type and capabilities of the components defining the subsystem). The digital twin may be derived using physics principles to determine an empirical linear dynamic model for the subsystem which relates operations of the subsystem to control settings, vehicle load, environmental conditions, and the like. For example, the digital twin of the cooling subsystem 210 may relate engine oil temperature, engine coolant temperature, and manifold air temperature to parameters such as ambient temperature, air pressure, altitude, engine load, radiator fan speed, intercoolant fan speed, and the like.

In an embodiment, the digital twin generator 308 creates the digital twin by transforming the obtained operating parameters and environmental conditions of the cooling subsystem 210 of the vehicle 104b using ordinary and partial differential equations. The differential equations may be entered into simulation software.

Although the digital twin generator 308 is described above as generating a digital twin for the cooling subsystem 210 of the vehicle 104b, it is recognized that the digital twin generator 308 is also configured to generate digital twins for other subsystems of the vehicle 104b as well for subsystems of other vehicles 104 in the fleet 106. The generated digital twins may be stored, at least temporarily, in the memory 306. The digital twin generator 308 may also be configured to update and/or revise a previously generated digital twin based on updated or new information obtained.

At 406, simulated performance data is received via execution of the digital twin with a designated model of the subsystem. As shown in FIG. 3, the digital twin system 120 includes a digital twin evaluator 326 that is configured to evaluate (or execute) the digital twin in a designated model of the subsystem. Optionally, the digital twin evaluator 326 may represent a discrete processor or set of processors relative to the digital twin generator 308, or alternatively may represent merely an additional functionality of a shared processor or set of processors of the digital twin system 120. The digital twin evaluator 326 simulates an operation of the subsystem during the trip of the vehicle 104 by evaluating the digital twin of the subsystem in a designated physics-based model of the subsystem.

The designated model of the subsystem may be one of multiple models associated with different subsystems of the vehicles 104. For example, one model may be designated for the cooling subsystem 210 and another model is designated for the propulsion subsystem 208. The designated model is configured to run a simulation to model the expected performance of the subsystem during the trip when exposed to the same conditions that the vehicle 104 was actually exposed to during the trip (e.g., for a completed trip). The designated model may be a software-based program that is installed as a package in a computer hardware device, incorporated as subroutines in an operating system, or contained in a stand-alone hardware device. For example, the designated model may be incorporated or installed within the digital twin system 120 (e.g., as a component of the digital twin evaluator 326). Alternatively, the model may be installed or incorporated within a separate computing device from the digital twin system 120, and the digital twin evaluator 326 accesses the model in the separate computing device. Alternatively, the sets of instructions in the software-based program of the simulation model may be hard-wired into the logic of a device, such as by being hard-wired logic formed in the hardware of the digital twin system 120 or a separate computing device.

The designated model may be created or built using characteristic information about the subsystem, physics-based models, and/or historical data acquired by monitoring the particular subsystem or similar subsystems. The characteristic information may represent the types of components in the subsystem, including designated performance capabilities of the components. The physics-based models may represent numerical algorithms that simulate how the components of the subsystem operate. The historical data may be acquired over time by monitoring the same subsystem during previous trips and/or by monitoring different (but similar) subsystems during other trips.

In an embodiment, the designated model for the cooling subsystem 210 incorporates a geographical model of the terrain along the route of the trip, a thermodynamic model of the engine, and a fluid dynamic model of the cooling subsystem. The geographical model of the terrain represents the characteristics of the route, such as the distance of the trip and the grade, slope, altitude, and the like of the route. The thermodynamic model represents how the engine reacts to different engine speeds and loads within the environment conditions experienced. The fluid dynamic model represents how the oil, coolant (e.g., water), and/or manifold air flows through the defined loops of the cooling subsystem.

The designated model may include a history-match aspect in which the current performance parameters of a simulated subsystem are compared to historical performance of similar subsystems of the same or similar vehicles, and adjustments are made to reasonably represent reality and to reduce noise variables. As used herein, a "similar subsystem" may have characteristics that are relevant for (e.g., meaningfully contribute to) the designated model of the subsystem that is used to evaluate a digital twin of a subsystem. For example, a subsystem that is similar to a cooling subsystem (or designated model thereof) on a first vehicle may be a cooling subsystem on a second vehicle that shares some relevant characteristics with the cooling subsystem on the first vehicle (e.g., same types of components, related operations, shared conditions experienced, etc.). The designated model may compare the digital twin of a specific subsystem with parameters and performance data of subsystems during previous trips with known outcomes (e.g., known coolant temperature increase due to heat absorbed from the engine). Based on similarities and/or differences with the previous trips of the same and/or similar subsystems exposed to the same and/or similar environmental conditions, the model can simulate (e.g., estimate or predict) performance of the subsystem during the selected trip. The model can be used to simulate performance of a subsystem during a past trip, during a current trip on which the vehicle is currently traveling, or during a future trip using forecasted parameters (e.g., cargo loads, tractive settings, etc.) and environmental conditions.

The execution of the digital twin of the subsystem with the designated model produces simulated performance data. The simulated performance data represents expected behavior or output of the subsystem during the trip when exposed to the given conditions. For example, the environmental conditions and operating parameters (e.g., cargo load, tractive settings, turbocharger speeds, etc.) may be considered as given inputs, and the simulated performance data is an output based on the given inputs. With reference to the cooling subsystem 210, some of the simulated performance data may include an engine oil outlet temperature, an engine oil inlet temperature, an engine coolant (e.g., water) outlet temperature, and engine coolant inlet temperature, a manifold air (outlet) temperature, and the like. The simulated performance data for the cooling subsystem 210 is not limited to the temperature parameters listed. Different subsystems may have different parameters representing the simulated performance data.

At 408 of the method 400, the simulated performance data is compared with field monitored performance data of the subsystem of the vehicle during the trip. For example, the same parameters represented as the simulated performance data may be monitored during the actual trip of the vehicle by the sensors 114 to obtain the field performance data (which is also referred to herein as actual performance data). The field performance data may be obtained directly from the vehicle control system 110 or from the diagnostic database 128. As shown in FIG. 3, the digital twin system 120 includes a health predictor 310 that is configured to compare the simulated performance data to the field performance data to determine a performance composite index of the subsystem. The health predictor 310 represents one or more processors of the digital twin system 120.

Figure 6:
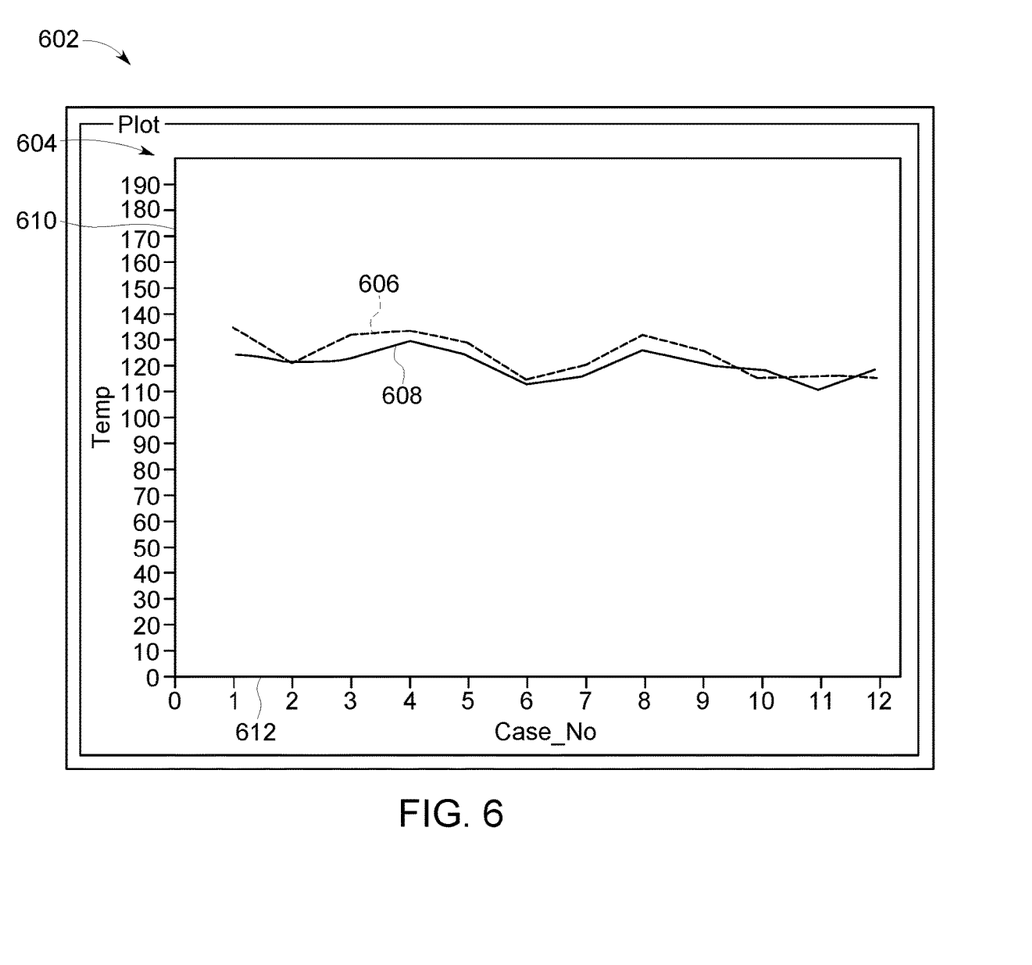
FIG. 6 shows a graphical user interface of the digital twin system for displaying a performance comparison graph according to an embodiment.

FIG. 6 shows a graphical user interface 602 of the digital twin system 120 for displaying a performance comparison graph 604 according to an embodiment. The graphical user interface 602 may be generated by the input device 302 and the output device 304 of the digital twin system 120. The graph 604 in the illustrated embodiment plots the manifold air temperature of the cooling subsystem 210 according to the simulated performance data 606 and the field performance data 608 to show the variance between the two data sources. The graph 604 may be displayed by selecting the Plot button 522 on the window 504 shown in FIG. 5, and then selecting the manifold air temperature on a subsequent window that prompts the operator to select one or more parameters for plotting. The y-axis 610 of the graph 604 represents temperature in degrees Fahrenheit, and the x-axis 612 represents a number of cases or specific data points. As shown in the graph 604, the manifold air temperature of the field performance data 608 varies from the simulated performance data 606, but is generally within ten degrees or within five degrees throughout the number of cases. The illustrated variance is less than 10% (and is also less than 7%) of the value of the manifold air temperature of the simulated performance data 606. Although only the manifold air temperature is shown, the health predictor 310 may compare multiple parameters of the simulated performance data to the field performance data.

Referring now back to the method 400 in FIG. 4, the performance index of the subsystem is determined at 410. For example, the health predictor 310 may determine or predict the health or performance condition of the subsystem by following, at least in part, the steps 412, 414, and 416 of the method 400. At 412, it is determined whether the field performance data is within a designated variance threshold of the simulated performance data. The designated variance threshold may be within about 10%, about 7%, about 5% or the like, of the value represented in the simulated performance data. As shown in FIG. 6, the manifold air temperature in the field performance data is within 7% of the manifold air temperature in the simulated performance data. Therefore, the field performance data is determined to be within the designated variance threshold. In this case, the flow continues to 414, and the subsystem is determined to be in good or satisfactory health range. The satisfactory health range indicates that the subsystem (actually) performed in the field as the subsystem was expected to perform, within a certain degree of permitted variance (which may be attributable to noise or other variables). Since the subsystem performed as expected, the subsystem is predicted to be in good or at least satisfactory health and is unlikely to fail during a subsequent trip that is within the prescribed capability of the subsystem. Therefore, at 418, the likelihood of failure of the subsystem is predicted to be low.

If, on the other hand, the field performance data is determined to not be within the designated variance threshold of the simulated performance data, such that the variance is greater than 10%, for example, then flow continues to 416 and the subsystem is determined to be outside of the satisfactory health range. Optionally, this condition may be referred to as "poor health". The poor health of the subsystem indicates that the subsystem did not perform in the field up to the standard that the subsystem was expected to perform. Since the subsystem did not perform as expected, the subsystem is predicted to be in poor health, such that one or more components of the subsystem may be damaged and/or in need of maintenance. Depending on the extent of the damage, the subsystem may fail during a subsequent trip that is within the prescribed capability of the subsystem. Therefore, at 418, the likelihood of failure of the subsystem is predicted to be higher than the likelihood of failure when the subsystem is determined to be within the satisfactory health range.

Although the health of the subsystem is described qualitatively in 414 and 416, the health predictor 310 optionally may determine a quantitative value for the performance composite index (e.g., a "performance condition score" or a "health score") for the subsystem. For example, the performance index may be based on a range from 1-10 or 1-100, which 1 indicating the worst health or condition (e.g., the subsystem has failed) and 10 (or 100) indicating the best health or condition (e.g., a brand new subsystem). The quantitative performance index may be determined based on a quantitative amount of the variance between the simulated performance data and the field performance data. For example, a variance of 2% indicates a better health than a variance of 4%, even though both subsystems would be considered within the satisfactory health range in 414. The subsystem having the 2% variance may be given a quantitative performance index of 9 (out of 10), while the subsystem with the 4% variance may be given a performance index of 7 (out of 10).

After determining the performance index of the subsystem, the digital twin system 120 may take additional, responsive action. Several responsive actions are described below with reference to steps 417, 418, 420, 422, 424, 426, and 428. It is recognized that these responsive actions are optional, such that all of the actions may be performed, some of the actions may be performed, or none of the actions may be performed. Additionally, the digital twin system 120 may be configured to take a responsive action that is not described in steps 417, 418, 420, 422, 424, 426, and 428.

For example, at 417, the digital twin system 120 is configured to control the vehicle based on the performance index of the subsystem. For example, the digital twin system 120 may control the vehicle by automatically slowing the vehicle, automatically stopping the vehicle, or preventing the vehicle from moving from a stationary position in response to determining that the subsystem has a less than satisfactory health or condition. Slowing, stopping, and/or preventing further movement of the vehicle may prevent additional strain and damage on the afflicted subsystem. In another embodiment, the digital twin system 120 may control the vehicle by controlling the vehicle to travel to a maintenance center in order to receive maintenance on the afflicted subsystem. The digital twin system 120 may control the vehicle during the current trip and/or during one or more subsequent trips based on the performance index. In another embodiment, the digital twin system 120 may control the vehicle by setting operational limits on the movement of the vehicle based on the performance index of the subsystem, which is described in step 428.

At 428, the performance index may be used to limit a speed of the vehicle, limit an acceleration of the vehicle, limit a power output of an engine, and/or limit a distance traveled by the vehicle. For example, if the propulsion subsystem 208 of a vehicle 104 has a relatively poor quantitative performance index of 3, then certain limits may be established to reduce the strain on the propulsion subsystem 208 in order to reduce the likelihood of a failure during the current trip or upcoming trips. The operational limits correspond to the afflicted subsystem. Therefore, if the cooling subsystem is determined to have a poor health, the acceleration and power output of the engine may be limited to reduce the load on the cooling system to dissipate heat from the engine. The operational limits may be narrower than limits set according to regulations (e.g., a speed limit for the route). Although the digital twin system 120 is described above as the component that controls the movement of the vehicle based on the performance index, alternatively the vehicle control system 110 onboard the specific vehicle 104 and/or the fleet control system 126 may control the vehicle based on the performance index.

At 420, a remaining life predictor 324 of the digital twin system 120 is configured to predict the remaining operational life of a subsystem based on the determined performance index of the subsystem. The remaining life predictor 324 represents one or more processors of the digital twin system 120. The remaining life predictor 324 may access deterioration data associated with subsystems similar to the subsystem of the vehicle 104. The deterioration data may track deterioration of the subsystems year over year. The deterioration data may be obtained from the diagnostic database 128 or retrieved from the memory 306 of the digital twin system 120. The remaining life predictor 324 is configured to correlate the performance index with the deterioration data to predict the remaining life of the subsystem. The remaining life of the subsystem refers to the amount of time or amount of trips before the performance of the subsystem either fails or falls below a designated threshold performance level, requiring significant and costly part replacements and/or repairs to remedy. For example, based on a specific type of subsystem (e.g., cooling subsystem 210), the remaining life predictor 324 may predict that a subsystem with a performance index of 6 has about five years remaining under forecasted usage and conditions. The remaining life predictor 324 may also utilize additional information, such as the current age of the subsystem, the current usage of the subsystem, and the current conditions to which the subsystem is exposed during usage in order to predict the remaining life.

At 422, the digital twin system 120 may schedule preventative maintenance for a vehicle based on the performance index of one or more subsystems of the vehicle. For example, the digital twin system 120 may schedule preventative maintenance in response to determining a performance index for a subsystem that is below a lower health threshold, such as below 4 out of 10. The digital twin system 120 may autonomously schedule the maintenance or may prompt an operator to schedule maintenance.

At 426, the digital twin system 120 notifies the operator as to the health of the subsystem. For example, the performance index may be displayed on the output device 304 for the operator to view. In addition, the digital twin system 120 may communicate the performance index remotely using the communication device 314. For example, the digital twin system 120 may communicate the performance index for the cooling subsystem 210 of the vehicle 104b to the vehicle control system 110 of the vehicle 104b, to the fleet control system 126, and/or to the diagnostic database 128 (for logging).

At 424, the vehicles of the fleet may be ranked and/or scheduled for subsequent trips based on the performance index of the subsystems. The performance index may be used to select which vehicle is to perform which upcoming trip. For example, a first vehicle with a subsystem in better health than a subsystem of a second vehicle may be selected for a first trip that is more strenuous on the subsystem than a second trip, which is assigned to the second vehicle. Furthermore, a first vehicle with a subsystem having a performance index of 2 may be scheduled for maintenance prior to a second vehicle with a subsystem having a performance index of 3, because the subsystem of the first vehicle has worse health. The ranking and scheduling of the vehicles may be performed by the digital twin system 120 or by the fleet control system 126. For example, the digital twin system 120 may communicate the performance indices to the fleet control system 126, and the fleet control system 126 may utilize the performance indices when determining a network trip schedule that includes multiple trips to be performed by multiple vehicles 104 in the fleet 106. In another example, the fleet control system 126 may reassign a vehicle to a different task (e.g., trip) based on the performance indices of the subsystems. A vehicle with a propulsion subsystem 208 in poor health may be reassigned from a longer, more arduous trip to a shorter, less strenuous trip.

In an embodiment, a system is provided that includes one or more processors configured to obtain operating parameters of a subsystem of a vehicle that is configured to travel along a route during a trip. The one or more processors are configured to generate a digital twin of the subsystem based on the operating parameters. The one or more processors are configured to receive simulated performance data generated by execution of the digital twin with a designated model of the subsystem. The one or more processors are further configured to obtain field performance data of the subsystem that is monitored by one or more sensors onboard the vehicle during the trip, and to determine a performance composite index of the subsystem of the vehicle based on a variance between the simulated performance data and the field performance data. The one or more processors are also configured to control the vehicle during the trip or during a subsequent trip of the vehicle based on the performance composite index.

Optionally, the one or more processors are configured to determine that the performance composite index of the subsystem is outside of a satisfactory health range responsive to the variance exceeding a designated variance threshold, and the one or more processors determine that the performance composite index of the subsystem is within the satisfactory health range responsive to the variance being within the designated variance threshold. Optionally, the designated variance threshold is 10% of the simulated performance data.

Optionally, the one or more processors are configured to control the vehicle by one or more of automatically slowing the vehicle, automatically stopping the vehicle, preventing the vehicle from moving, limiting a speed of the vehicle, limiting an acceleration of the vehicle, or limiting a distance traveled by the vehicle based on the performance composite index.

Optionally, the one or more processors are configured to receive the operating parameters of the subsystem from one or more of a vehicle control system on the vehicle or a diagnostics database that stores information about previous trips of the vehicle.

Optionally, the one or more processors are further configured to receive environmental conditions to which the vehicle is exposed during the trip. The one or more processors are configured to generate the digital twin of the subsystem based on both the operating parameters and the environmental conditions.

Optionally, the one or more processors are configured to determine the performance composite index of the subsystem of the vehicle during or after the trip of the vehicle.

Optionally, the one or more processors are further configured to predict a remaining life of the subsystem based on the performance composite index of the subsystem and deterioration data associated with subsystems similar to the subsystem of the vehicle. The deterioration data is stored in a database.

Optionally, the subsystem is a cooling system, and the simulated performance data includes one or more of an oil temperature, a coolant temperature, or a manifold air temperature during the trip.

Optionally, the subsystem is a propulsion subsystem, and the operating parameters includes one or more of a notch setting, a turbine speed, a fuel input rate, or an air input rate.

Optionally, the simulated performance data for the propulsion subsystem includes one or more of an engine power output, a fuel consumption rate, an engine temperature, or an exhaust emission rate during the trip.

Optionally, responsive to determining the performance composite index of the subsystem of the vehicle, the one or more processors are configured to schedule preventative maintenance for the vehicle.

Optionally, responsive to determining the performance composite index of the subsystem of the vehicle, the one or more processors are configured to select a subsequent trip for the vehicle from among multiple available trips.

Optionally, responsive to determining the performance composite index of the subsystem of the vehicle, the one or more processors are configured to activate an output device to notify an operator of the performance composite index of the subsystem.

Optionally, responsive to determining the performance composite index of the subsystem of the vehicle, the one or more processors are configured to rank the vehicle relative to other vehicles in a common fleet.

Optionally, responsive to determining the performance composite index of the subsystem of the vehicle, the one or more processors are configured to set operational limits for controlling the movement of the vehicle.

In another embodiment, a system is provided that includes one or more processors configured to obtain operating parameters of a subsystem of a vehicle that is configured to travel along a route during a trip. The one or more processors are configured to generate a digital twin of the subsystem based on the operating parameters. The one or more processors are configured to receive simulated performance data generated by execution of the digital twin with a designated model of the subsystem. The one or more processors are further configured to obtain field performance data of the subsystem that is monitored by one or more sensors onboard the vehicle during the trip, and to determine a performance composite index of the subsystem of the vehicle based on a variance between the simulated performance data and the field performance data.

Optionally, the one or more processors are configured to receive the operating parameters and the field performance data of the subsystem from one or more of a vehicle control system on the vehicle or a diagnostics database that stores information about previous trips of the vehicle.

In another embodiment, a method is provided that includes obtaining operating parameters of a subsystem of a vehicle that is configured to travel along a route during a trip. The method also includes generating a digital twin of the subsystem based on the operating parameters, and receiving simulated performance data generated by execution of the digital twin with a designated model of the subsystem. The method further includes obtaining field performance data of the subsystem that is monitored by one or more sensors onboard the vehicle during the trip, and determining a performance composite index of the subsystem of the vehicle based on a variance between the simulated performance data and the field performance data.

Optionally, the performance composite index of the subsystem is determined to be outside of a satisfactory health range responsive to the variance exceeding a designated variance threshold, and the performance composite index of the subsystem is determined to be within the satisfactory health range responsive to the variance being within the designated variance threshold. Optionally, the designated variance threshold is 10% of the simulated performance data.

Optionally, the operating parameters of the subsystem are received from one or more of a vehicle control system on the vehicle or a diagnostics database that stores information about previous trips of the vehicle.

Optionally, the method further includes receiving environmental conditions to which the vehicle is exposed during the trip. The digital twin of the subsystem is generated based on both the operating parameters and the environmental conditions.

Optionally, the method further includes predicting a likelihood of failure of the subsystem during the trip or during a subsequent trip based on the performance composite index of the subsystem.

Optionally, the method further includes predicting a remaining life of the subsystem based on the performance composite index of the subsystem and deterioration data associated with subsystems similar to the subsystem of the vehicle. The deterioration data is stored in a database.

Optionally, the subsystem is a cooling system. The simulated performance data includes one or more of an oil temperature, a coolant temperature, or a manifold air temperature of the cooling system during the trip.

Optionally, the subsystem is a propulsion subsystem. The operating parameters include one or more of a notch setting, a turbine speed, a fuel input rate, or an air input rate. The simulated performance data for the propulsion subsystem includes one or more of an engine power output, a fuel consumption rate, an engine temperature, or an exhaust emission rate during the trip.

Optionally, the method further includes scheduling preventative maintenance for the vehicle responsive to determining the performance composite index of the subsystem of the vehicle.

Optionally, the method further includes selecting a subsequent trip of the vehicle from among multiple available trips responsive to determining the performance composite index of the subsystem of the vehicle.

Optionally, the method further includes activating an output device to notify an operator of the health of the subsystem responsive to determining the performance composite index of the subsystem of the vehicle.

Optionally, the method further includes ranking the vehicle relative to other vehicles in a common fleet responsive to determining the performance composite index of the subsystem of the vehicle.

Optionally, the method further includes setting operational limits for controlling the movement of the vehicle during the trip or a subsequent trip responsive to determining the performance composite index of the subsystem of the vehicle.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    one or more processors configured to obtain operating parameters of a subsystem of each vehicle of a plurality of vehicles in a fleet that is configured to travel along a route during a trip, the one or more processors configured to generate a digital twin of the subsystem based on the operating parameters, the one or more processors configured to receive simulated performance data generated by execution of the digital twin with a designated model of the subsystem,
    wherein the one or more processors are further configured to obtain field performance data of the subsystem that is monitored by one or more sensors onboard the each vehicle during the trip and to determine a performance composite index of the subsystem of the each vehicle based on a variance between the simulated performance data and the field performance data,
    wherein responsive to determining for the each vehicle the performance composite index based on the variance between the simulated performance data and the field performance data, the one or more processors are further configured to rank the each vehicle of the plurality of vehicles for selection during a subsequent trip of the each vehicle.

2. The system of claim 1, wherein the one or more processors are configured to determine that the performance composite index of the subsystem is outside of a satisfactory health range responsive to the variance exceeding a designated variance threshold, the one or more processors determining that the performance composite index of the subsystem is within the satisfactory health range responsive to the variance being within the designated variance threshold.

3. The system of claim 2, wherein the designated variance threshold is 10% of the simulated performance data.

4. The system of claim 1, wherein the one or more processors are configured to control at least one vehicle of the plurality of vehicles based on the performance composite index by one or more of automatically slowing the at least one vehicle, automatically stopping the at least one vehicle, preventing the at least one vehicle from moving, limiting a speed of the at least one vehicle, limiting an acceleration of the at least one vehicle, or limiting a distance traveled by the at least one vehicle.

5. The system of claim 1, wherein the one or more processors are configured to receive the operating parameters of the subsystem from one or more of a vehicle control system on at least one vehicle of the plurality of vehicles or a diagnostics database that stores information about previous trips of the at least one vehicle.

6. The system of claim 1, wherein the one or more processors are further configured to receive environmental conditions to which at least one vehicle of the plurality of vehicles is exposed during the trip, the one or more processors configured to generate the digital twin of the subsystem based on both the operating parameters and the environmental conditions.

7. The system of claim 1, wherein the one or more processors are further configured to predict a remaining life of the subsystem based on the performance composite index of the subsystem and deterioration data associated with subsystems similar to the subsystem of at least one vehicle of the plurality of vehicles, the deterioration data stored in a database.

8. The system of claim 1, wherein the subsystem is a cooling system, the simulated performance data including one or more of an oil temperature, a coolant temperature, or a manifold air temperature during the trip.

9. The system of claim 1, wherein the subsystem is a propulsion subsystem, the operating parameters including one or more of a notch setting, a turbine speed, a fuel input rate, or an air input rate.

10. The system of claim 9, wherein the simulated performance data for the propulsion subsystem includes one or more of an engine power output, a fuel consumption rate, an engine temperature, or an exhaust emission rate during the trip.

11. The system of claim 1, wherein, responsive to determining the performance composite index of the subsystem of the each vehicle of the plurality of vehicles, the one or more processors are configured to schedule preventative maintenance for the each vehicle.

12. The system of claim 1, wherein, responsive to determining the performance composite index of the subsystem of at least one vehicle of the plurality of vehicles, the one or more processors are configured to activate an output device to notify an operator of the performance composite index of the subsystem.

13. The system of claim 1, wherein, responsive to determining the performance composite index of the subsystem of at least one vehicle of the plurality of vehicles, the one or more processors are configured to set operational limits for controlling the movement of the at least one vehicle.

14. A system comprising:
one or more processors configured to obtain operating parameters of a subsystem of each vehicle of a plurality of vehicles in a fleet that is configured to travel along a route during a trip, the one or more processors configured to generate a digital twin of the subsystem based on the operating parameters, the one or more processors configured to receive simulated performance data generated by execution of the digital twin with a designated model of the subsystem,
wherein the one or more processors are further configured to obtain field performance data of the subsystem that is monitored by one or more sensors onboard the each vehicle during the trip, and to determine a performance composite index of the subsystem of the each vehicle based on a variance between the simulated performance data and the field performance data
wherein responsive to determining for the each vehicle the performance composite index based on the variance between the simulated performance data and the field performance data, the one or more processors are further configured to schedule the each vehicle of the plurality of vehicles for a subsequent trip of the each vehicle.

15. The system of claim 14, wherein the one or more processors are configured to determine that the performance composite index of the subsystem is outside of a satisfactory health range responsive to the variance exceeding a designated variance threshold, the one or more processors determining that the performance composite index of the subsystem is within the satisfactory health range responsive to the variance being within the designated variance threshold.

16. The system of claim 14, wherein the one or more processors are configured to schedule preventative maintenance for the each vehicle based on the performance composite index of the subsystem.

17. The system of claim 14, wherein the one or more processors are further configured to predict a remaining life of the subsystem based on the performance composite index of the subsystem and deterioration data associated with subsystems similar to the subsystem of the each vehicle, the deterioration data stored in a database.

18. The system of claim 14, wherein the one or more processors are further configured to receive environmental conditions to which the each vehicle is exposed during the trip, the one or more processors configured to generate the digital twin of the subsystem based on both the operating parameters and the environmental conditions.

19. The system of claim 14, wherein the one or more processors are configured to receive the operating parameters and the field performance data of the subsystem from one or more of a vehicle control system on the each vehicle or a diagnostics database that stores information about previous trips of the each vehicle.

20. A system comprising:
one or more processors configured to obtain operating parameters of a subsystem of each vehicle of a plurality of vehicles in a fleet during a trip of the each vehicle along a route and environmental conditions experienced by the subsystem during the trip, the one or more processors configured to evaluate the operating parameters and the environmental conditions in a numerical model of the subsystem to generate simulated performance data of the subsystem, the simulated performance data representing expected performance of the subsystem along the route according to the operating parameters and the environmental conditions experienced by the subsystem,
wherein the numerical model of the subsystem is built using characteristic information about the subsystem, one or more physics-based models associated with how the subsystem operates, and historical performance data acquired over time by monitoring one or more of the subsystem or similar subsystems,
wherein the one or more processors are further configured to obtain field performance data of the subsystem that is monitored by one or more sensors onboard the each vehicle during the trip and to determine a performance composite index of the subsystem of the each vehicle based on a variance between the simulated performance data and the field performance data, and
wherein responsive to determining for the each vehicle the performance composite index based on the variance between the simulated performance data and the field performance data, the one or more processors are further configured to rank the each vehicle of the plurality of vehicles for selection during a subsequent trip of the each vehicle.

* * * * *